United States Patent
Bach et al.

(10) Patent No.: US 9,900,339 B2
(45) Date of Patent: *Feb. 20, 2018

(54) CLOUD-BASED SECURITY PROFILING, THREAT ANALYSIS AND INTELLIGENCE

(71) Applicant: salesforce.com, inc., San Francisco, CA (US)

(72) Inventors: Timothy Bach, Emeryville, CA (US); James Dolph, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,986

(22) Filed: Feb. 27, 2017

(65) Prior Publication Data

US 2017/0180410 A1    Jun. 22, 2017

Related U.S. Application Data

(63) Continuation of application No. 14/664,502, filed on Mar. 20, 2015, now Pat. No. 9,619,655.

(60) Provisional application No. 62/049,614, filed on Sep. 12, 2014.

(51) Int. Cl.
| | |
|---|---|
| *G06F 21/57* | (2013.01) |
| *H04L 29/06* | (2006.01) |
| *H04L 29/08* | (2006.01) |

(52) U.S. Cl.
CPC ........ *H04L 63/1433* (2013.01); *G06F 21/577* (2013.01); *H04L 67/025* (2013.01); *H04L 67/26* (2013.01); *G06F 2221/034* (2013.01)

(58) Field of Classification Search
CPC ............................... H04L 63/14; G06F 21/577
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

Website page printed Mar. 19, 2015, cwe.mitre.org, copyright 2006-2015, 1 page.

(Continued)

*Primary Examiner* — Izunna Okeke
(74) *Attorney, Agent, or Firm* — Schwabe Williamson & Wyatt

(57) ABSTRACT

An automated software vulnerability scanning and notification system and method provide an automated detection and notification regarding a software vulnerability. The operation of the system and the method includes obtaining software vulnerability information, periodically scanning a web application and a corresponding web server associated with an operator, and evaluating the periodic scans relative to the software vulnerability information to detect software vulnerabilities. Upon detection of a software vulnerability, a notification message is provided automatically to the operator regarding the software vulnerability.

16 Claims, 5 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2005/0097199 A1* | 5/2005 | Woodard .............. H04L 67/125 709/223 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0150072 A1* | 5/2015 | Doctor .................... H04L 63/20 726/1 |

OTHER PUBLICATIONS

Website page printed Mar. 19, 2015, cve.mitre.org, copyright 1999-2015, 1 page.

\* cited by examiner

CLOUD-BASED SECURITY PROFILING, THREAT ANALYSIS AND INTELLIGENCE

RELATED APPLICATION

This application is a continuation application of U.S. patent application Ser. No. 14/664,502, filed Mar. 20, 2015, which is a non-provisional of U.S. Provisional Patent Application No. 62/049,614, filed Sep. 12, 2014, which are all incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This disclosure relates generally to detecting software vulnerabilities, and more particularly, to automated detection and notification regarding software vulnerabilities.

BACKGROUND

There are currently public systems for tracking known software vulnerabilities in certain pieces or versions of software frequently used online. For instance, Mitre Corporation publicizes raw information about disclosed vulnerabilities or security weaknesses in software through a dictionary called CVE® Common Vulnerabilities and Exposures system and a list called CWE™ Common Weakness Enumeration system.

The pace at which these vulnerabilities are publicized is often rapid, and thus it can be difficult even for companies having a full-time server and application administrators to keep track of required updates. As a result, there may be vulnerable pieces of software installed as part of an application or as part of a server software stack, despite the existence of publically available fixes for known vulnerabilities. Lack of knowledge about the need to update software used in applications or servers cause them to remain vulnerable.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for detecting flooding of message queues.

Example System Overview

Figure 1A:
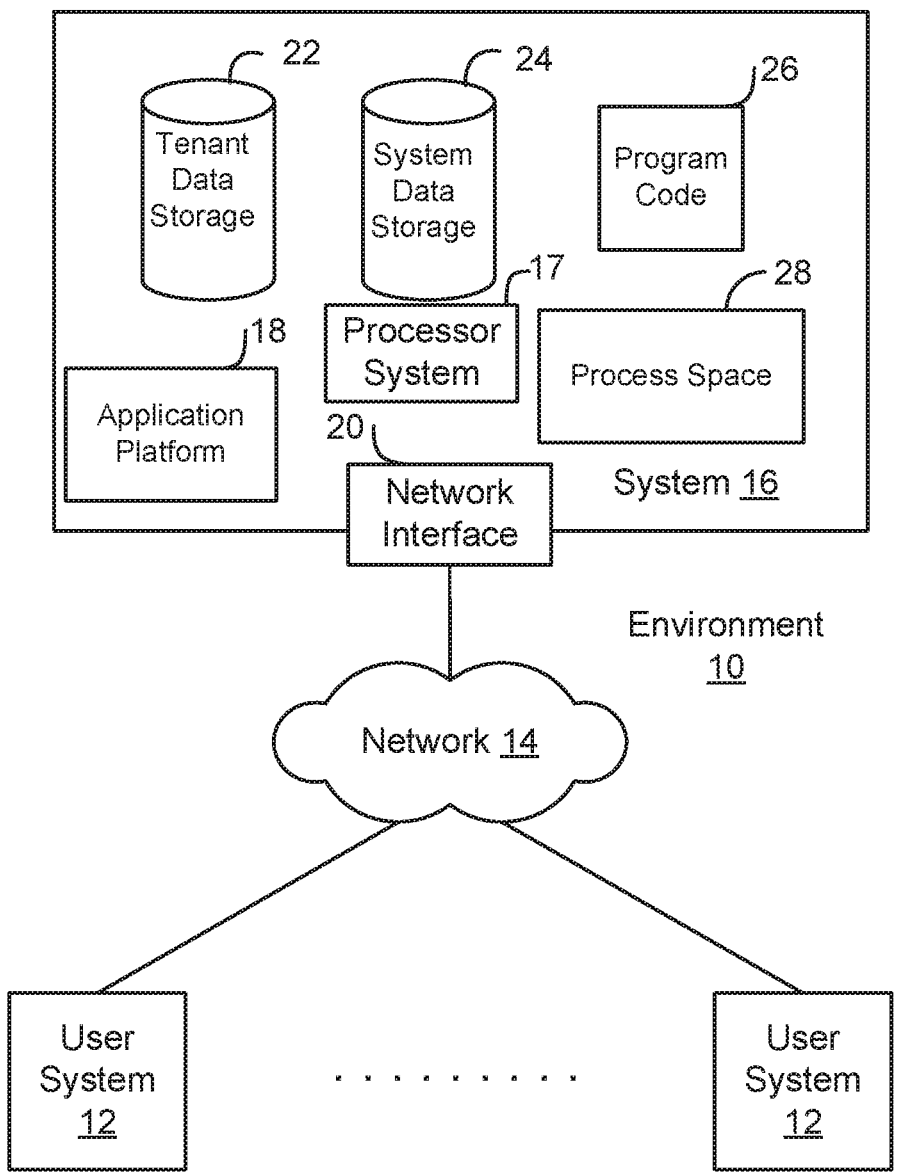
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications. Applications may be developed by the provider of the on-demand database service, by users accessing the on-demand database service via user systems 12, or by third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 may be configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a wearable device, a mobile cellular phone (for example, a "smartphone"), or any other Wi-Fi-enabled device, wireless access protocol (WAP)-enabled device, or other computing device capable of interfacing directly or indirectly to the Internet or other network.

The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
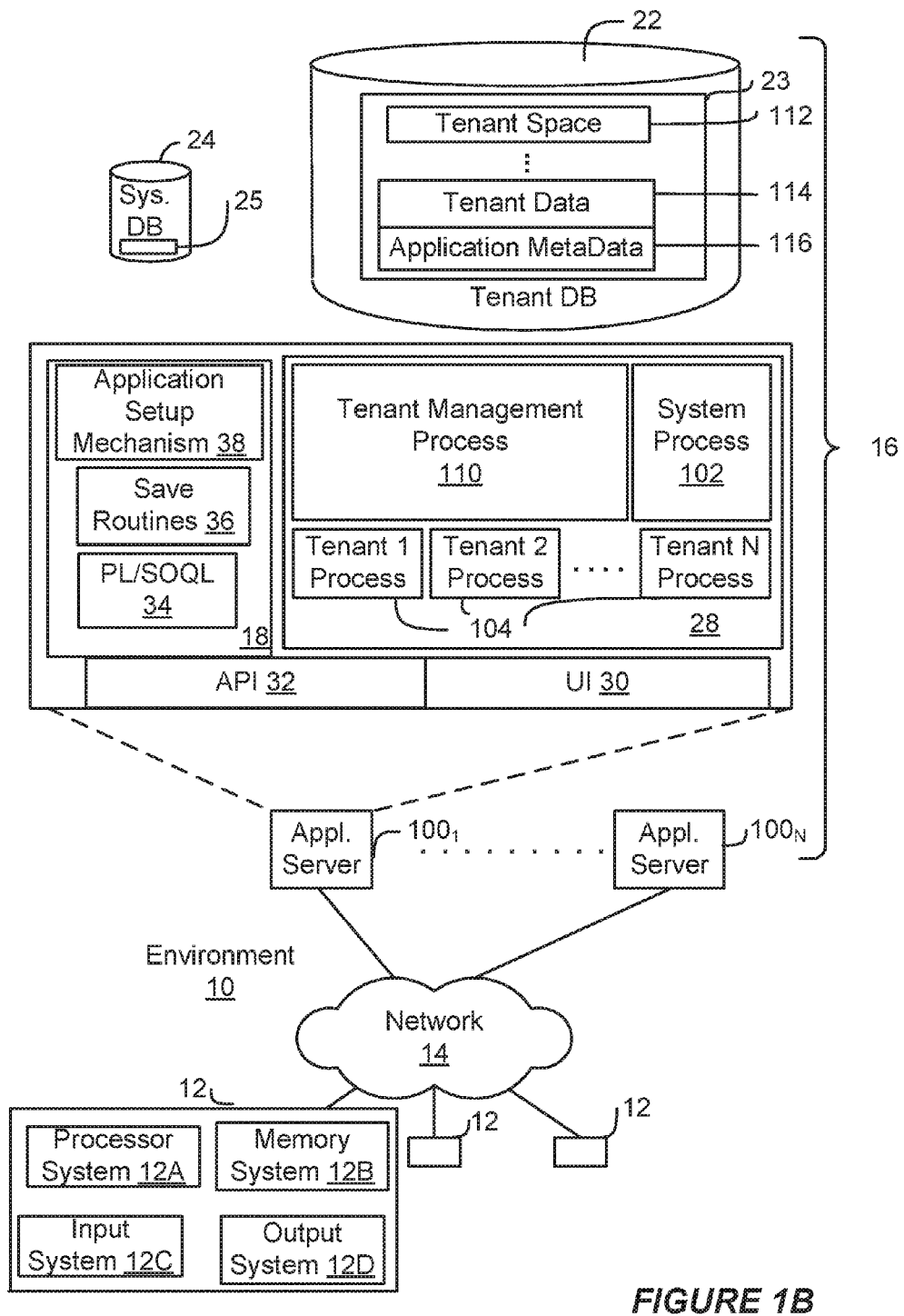
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
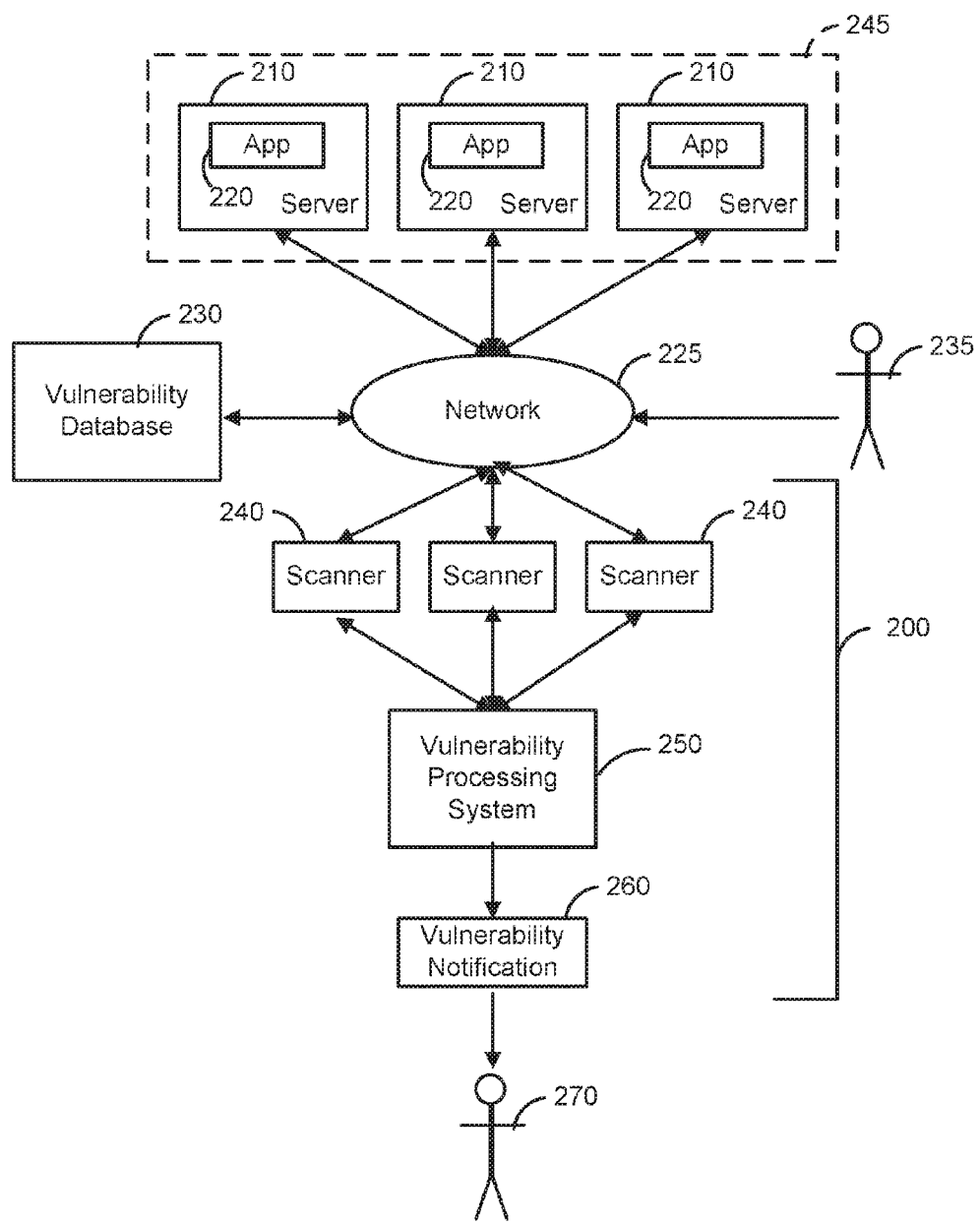
FIG. 2 a block diagram of an automated software vulnerability scanning and notification system.

FIG. 2 is a block diagram of an automated software vulnerability scanning and notification system 200 that provides automated scanning of network-based (e.g., web-based) servers 210 and applications 220 to identify and provide notification of software-based information-security vulnerabilities, weaknesses, or exposures (referred to herein collectively as vulnerabilities). Such vulnerabilities may be listed and updated in publicly-available vulnerability database 230 such as, for example, the CVE® Common Vulnerabilities and Exposures system or the CWE™ Common Weakness Enumeration system, both maintained by MITRE Corporation as dictionaries, libraries, or databases of publicly known information-security software vulnerabilities, or any other dictionary, library, or database information-security software vulnerabilities. Optionally, vulnerability information in vulnerability database 230 may be supplemented manually by a software vulnerability engineer to include updated vulnerability information.

Servers 210 and applications 220 may be independently available on and accessible from a computer network 225, such as the Internet, or may be included in a cloud-based tenant database system 245 of a type similar to tenant database system 16 of FIGS. 1A and 1B such as, for example, the Independent Software Vendors ("ISVs") in the AppExchange program of Salesforce.com, Inc. For purposes of illustration, each of servers 210 is illustrated as including one application 220. It will be appreciated that each server 210 could include one or more applications 220.

Vulnerability scanning and notification system 200 includes one or more network-based (e.g., cloud-based) scanners 240 that scan servers 210 and applications 220 to identify software types and versions operating on servers 210 and included in applications 220. For example, scanners 240 may determine any or all of:

SSL Library and Cryptographic Keys
E.g. OpenSSL, GNUTLS, Mozilla NSS, Java JSSE, MS SChannel Server OS
E.g. Apache, Tomcat, HP, IBM, Nginx, OS X, MS Server, Thin, Flask
Ancillary Server Software Installed
Programming Languages in Use
E.g. PHP, Ruby, etc.
Application Frameworks
E.g. Drupal, Wordpress, Joomla, Rails
Common software plugins and additions
E.g. Timthumb, image magik, Wordpress plugins, CKEditor, TinyMCE, et. al.
Relational Database System software
E.g. MySQL, Postgres, MSSQL
Database Caching software
JS libraries in UI
E.g. Prototype, jQuery
Web Application Firewalls (WAF's)
Load Balancers
E.g. F5, A10, NetScaler, Riverbed, Cisco ACE
Hosting Providers
E.g. Amazon AWS, Netflare
Partially Installed Software (which can also in and of itself be a vulnerability)

In one implementation, scanners 240 may be implemented with a conventional network mapping tool such as, for example, the Nmap Network Mapper, an open source utility for network discovery and security auditing available from nmap.org. In addition or alternatively, scanners 240 may employ any or all of the following detection mechanisms to determine information about the types and version of software on servers 210 and in applications 220:

Response Headers and Header Ordering
Port Scanning
syn/ack and hello messages
IP-based fingerprinting technologies
Defined IP ranges
Response Body heuristics
Javascript include tags
Common error stack traces/messages
Default pages/resources
Default Server Responses
Protocol Behavior
Malformed Requests/Systematic Errors/Mistakes
Improper Version or Protocol Responses
Statistical Analysis
Signature Analysis Scanners 240 provide the information about the software types and versions of servers 210 and applications 220 to a vulnerability processing system 250, which is also in communication with vulnerability database 230 and includes a record identifying the operators of servers 210 and applications 220. For example, scanners 240 may scan servers 210 and applications 220 periodically (e.g., weekly or monthly) to identify software types and versions used on servers 210 and in applications 220, and vulnerability processing system 250 may store the results of the scans over time in association with the record of the corresponding operators. In connection with the results of each scan, for example, vulnerability processing system 250 compares the scan results with the records of vulnerability database 230 to identify any vulnerabilities for the scanned server 210 or application 220.

Upon identifying a vulnerability, vulnerability processing system 250 transmits a notification message 260 to the corresponding operator 270. The message may be transmitted in any computer-based communication format, including email or a dedicated messaging system associated with vulnerability scanning and notification system 200. The message may include identification of the vulnerable software type and version, as well as a suggested remediation such as updating the version of the vulnerable software. In one implementation, the notification message 260 may be provided on a network or web portal that is associated with cloud-based tenant database system 245, for example, and may provide the operator with any or all of: information about detected vulnerabilities and remediation steps, viewing of vulnerability scan results, launching of vulnerability scans, viewing current performance or usage information about the application, and tools to update the application.

Figure 3:
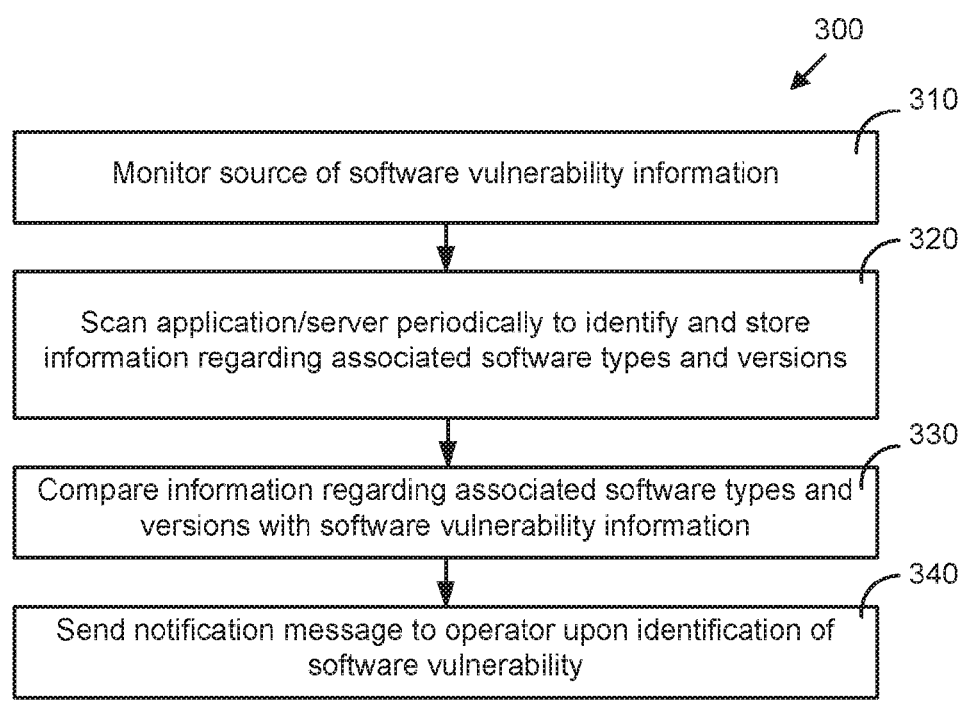
FIG. 3 a flow diagram of an automated software vulnerability scanning and notification method.

FIG. 3 is a flow diagram illustrating an automated software vulnerability scanning and notification method 300. In one implementation, process 300 may be performed in connection with operation of vulnerability scanning and notification system 200.

In process block 310, a source of software vulnerability information is monitored. For example, the source may be a publicly-available database, library, or other type of listing.

In process block 320, a scan of a network-based application, server, or both, is made periodically to identify and store information regarding software types and versions associated with the application, the server, or both. For example, the scan may determine any or all of the types of information described above with reference to the operation of scanners 240 in any or all of the manners described with reference to scanners 240. In one implementation, the scanning of applications and servers may be made on behalf of operators of applications and servers, which operators subscribe to a service provider who operates vulnerability scanning and notification system 200 or otherwise performs the operations of method 300.

In process block 330, the information regarding software types and versions associated with the application, the server, or both, is compared with the software vulnerability information to identify software vulnerabilities.

In process block 340, upon identification of a software vulnerability, a notification message is sent to the corresponding operator of the application or server. The notification message may identify the software vulnerability and may also include suggested steps for remediation or protection against the vulnerability.

Automated software vulnerability scanning and notification method 300 may be implemented in accordance with instructions that are stored on or in tangible, non-transitory computer-readable media and that are executable by or used to program one or more computing systems or devices. Moreover, automated software vulnerability scanning and notification method 300 and corresponding instructions provide improved efficiency in protecting servers 210 and applications 220 against vulnerabilities. As a result, process 300 relates to improving the technological operation of servers 210 and applications 220.

Storing the results of the periodic scans performed by vulnerability scanning and notification system 200 and method 300 provides a record or history of software types and versions used in applications and servers. An aspect of software vulnerabilities is that the discovery of them occurs irregularly and episodically. As a consequence, software types and versions that are deemed not vulnerable at one time might later be deemed vulnerable if a particular vulnerability is later discovered. A benefit of the record or history of software types and versions identified in applications and servers by system 200 and method 300 is that vulnerabilities can be identified promptly even in relation to legacy software that had previously been deemed not vulnerable.

Figure 4:
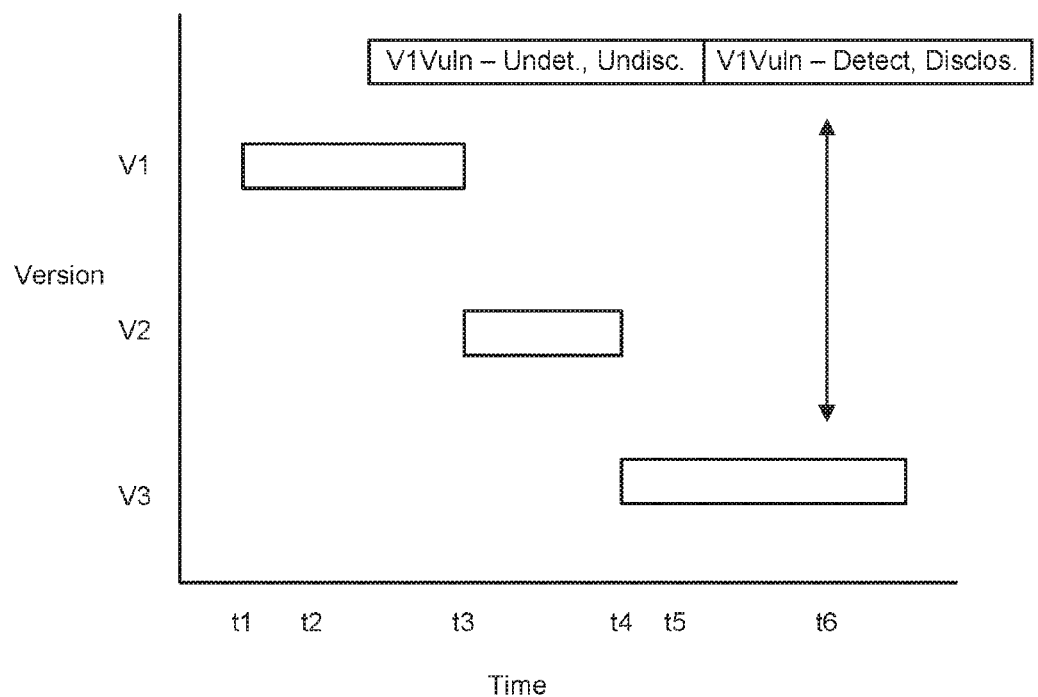
FIG. 4 is a timing diagram illustrating successive installation of software versions relative to a software vulnerability.

FIG. 4 is a timing diagram illustrating successive installation of software versions V1-V3 relative to arbitrary times t1 -t5 and a vulnerability to version V1 of the software that arises at time t2.

Version V1 of the software as of time t1 has no vulnerabilities. At time t2 a vulnerability to version V1 arises (V1Vuln), but is undetected and undisclosed. It will be appreciated that software vulnerabilities generally arise in such a manner, in which they are undetected and undisclosed for some amount of time. At a time t3, software version V2 replaces version V1. At a time t4, software version V3 replaces version V2. At a time t5, vulnerability to version V1 (V1Vuln) is detected and disclosed. At a time t6, a manual comparison by an operator or engineer of the V1 vulnerability (V1Vuln) to the current version V3 could suggest a conclusion that there is no vulnerability so that no remedial action is taken.

The conclusion that there is no vulnerability is not sound. The system had been vulnerable to the V1 vulnerability (V1Vuln), and a breach arising from the vulnerability could remain. However, version upgrades between the vulnerability, the detection and disclosure of the vulnerability, and the check of the system, obscure the vulnerability. While engineers experienced in software vulnerability analysis check upgrade histories, such checks can be time-consuming and inconclusive depending on version upgrade records maintained by the operator. In contrast, the record or history of software types and versions in the stored results of the periodic scans performed by vulnerability scanning and notification system 200 and method 300 allow system 200 and method 300 to provide convenient identification of historic vulnerabilities promptly upon disclosure of them, even for operators inexperienced with software vulnerability analysis.

A person having ordinary skill in the art will appreciate that there are many potential applications for one or more implementations of this disclosure and hence, the implementations disclosed herein are not intended to limit this disclosure in any fashion.

The invention claimed is:

1. An apparatus to identify a software vulnerability, comprising:
   a processor; and
   one or more stored sequences of instructions which, when executed by the processor, cause the processor to:
   identify software vulnerability information;
   periodically scan at least one of a network application and a network server for information about software associated with the network application and the network server and for information about upgraded versions of the software;
   store the information about the software and the upgraded versions of the software, the information including information for versions of the software with undetected vulnerabilities; and
   periodically evaluate the information about the software and the upgraded versions of the software relative to the software vulnerability information to detect a software vulnerability in at least one of the software and upgraded versions of the software;

provide a notification message to a user device regarding the software vulnerability; and provide with the notification message steps for remediation or protection against the software vulnerability.

2. The apparatus of claim 1 in which the one or more stored sequences of instructions which, when executed by the processor, cause the processor to receive information through a user interface that includes the software vulnerability information.

3. The apparatus of claim 1 further including one or more stored sequences of instructions which, when executed by the processor, cause the processor to store each periodic scan of the network application and network server.

4. The apparatus of claim 1 in which the one or more stored sequences of instructions which, when executed by the processor, cause the processor to periodically scan both the network application and the network server on which the network application runs.

5. The apparatus of claim 1 in which the one or more stored sequences of instructions which, when executed by the processor, cause the processor to access a database to identify the software vulnerability information.

6. The apparatus of claim 1 further comprising:

multiple scanners each including processors and one or more stored sequences of instructions which, when executed by the processors, cause the processors to:

periodically scan different network applications and network servers for information about software, and upgraded versions of the software, associated with the different network application and network servers; and store the information about the software and the upgraded versions of the software.

7. A non-transitory machine-readable medium carrying one or more sequences of instructions, when executed by one or more processors, cause the one or more processors to perform operations comprising:

obtaining software vulnerability information;

periodically scanning at least one of a web application and a web server for information about types and versions of software associated with the at least one web application and web server, wherein the at least one web application and web server operate within a cloud-based database system;

storing multiple ones of the periodically scanned information to provide a history of the types and versions of the software associated with the at least one web application and web server including the types and versions of the software with undetected or undisclosed vulnerabilities;

periodically evaluating the stored multiple ones of the periodically scanned information relative to the software vulnerability information to detect software vulnerabilities in the types and versions of the software; and upon detection of a software vulnerability, providing a notification message regarding the software vulnerability.

8. The machine-readable medium of claim 7 in which the one or more sequences of instructions, when executed by one or more processors, cause the one or more processors to provide with the notification message performance information associated with the at least one web application and web server.

9. The machine-readable medium of claim 7 in which the one or more sequences of instructions, when executed by one or more processors, cause the one or more processors to perform operations comprising receiving user inputs including at least some of the software vulnerability information.

10. The machine-readable medium of claim 7 in which the one or more sequences of instructions, when executed by one or more processors, cause the one or more processors to perform operations comprising providing the notification message to a network portal.

11. The apparatus of claim 7 further including one or more sequences of instructions, when executed by one or more processors, cause the one or more processors to perform operations comprising storing the information for each periodic scan of the web application and web server.

12. The machine-readable medium of claim 7 wherein different processors in different scanners each periodically scan different web applications and web servers for information about types and versions of software associated with the different web applications and web servers.

13. A method for identifying a software vulnerability, comprising:

obtaining, by a processor, software vulnerability information;

periodically scanning, by the processor, a cloud-based database system for information about types and versions of software and information about upgraded types and versions of the software;

storing, by the processor, each of the scanned information, including types and versions of the software with undetected or undisclosed vulnerabilities;

periodically evaluating, by the processor, the stored information, including previously scanned and stored information, relative to the software vulnerability information to detect software vulnerabilities; and upon detection of a software vulnerability, by the processor, providing a notification message regarding the software vulnerability.

14. The method of claim 13 further comprising providing performance or usage information for the software with the notification message.

15. The method of claim 13 further comprising receiving the software vulnerability information from a user system.

16. The method of claim 13 further comprising storing the scanned information for each periodic scan of the cloud-based database system.

* * * * *